3,331,891
SOLID COATING COMPOSITION COMPRISING DI-ALLYL PHTHALATE PREPOLYMER, UNSATU-RATED POLYESTER AND MONOMER
James L. Thomas, Baltimore, and Harry H. Beacham, Severna Park, Md., assignors to FMC Corporation, New York, N.Y., a corporation of Delaware
No Drawing. Filed Oct. 23, 1965, Ser. No. 504,081
3 Claims. (Cl. 260—862)

This invention relates to solid coating compositions of the type used for fluid bed coating and electrostatic spraying, and has as its principal object the provision of such compositions which have unique wet electrical properties.

Among the newer techniques for applying coatings are fluid bed coating and powder spraying. In fluid bed coating, a bed of small size solid particles of the coating is fluidized by a fluidizing gas, and the articles to be coated, heated above the melting point of the fluid coating, are dipped into the fluid bed; they melt enough of the solids to form an adherent film. In powder spraying, solid particles are directed against a heated object, most preferably by electrostatic attraction; the object retains the coating by partial melting. In each case, the final film is produced by fusion of the coating particles into a smooth film.

Attempts have been made to use diallyl phthalate prepolymers by such techniques, because these materials have uniquely good wet electrical properties, i.e., they show little or no change in resistance or loss factor after continuous exposure to moisture and high humidities. However, these thermosetting resins have not proved amenable to use in fluid bed coating or electrostatic spraying, principally because they do not form continuous films on heating under the conditions of fluid bed coating and electrostatic spraying.

The principal object of this invention is the provision of diallyl phthalate prepolymer coatings which will form satisfactory films when applied by fluid bed or electrostatic spraying techniques, without loss of the typical desirable electrical properties of diallyl phthalate resins.

In accordance with this invention, we blend 100 parts by weight of solid diallyl phthalate prepolymer with 5 to 50 parts by weight of a solid polyester which is solid at room temperatures, and which melts at a temperature below about 120° C., and is made by condensing a glycol and a polybasic carboxylic acid, 25 to 75% of the acid being unsaturated, to a point where the resin is solid at normal room temperatures, up to about 35° C., but which melts below 120° C. An essential ingredient of the composition is sufficient polymerization catalyst to convert the combination to the insoluble state, on further heating. Optional ingredients include filler, pigment, diallyl phthalate monomer, and mixing aids.

The diallyl phthalate prepolymers useful in this invention are made by polymerizing diallyl orthophthalate by standard polymerization techniques, such as emulsion, solution or bulk polymerization, usually with a peroxide catalyst, as described by Pollack et al. in U.S. Patent No. 2,273,891.

As the diallyl phthalate polymerization reaction is allowed to proceed, the viscosity of the medium increases slowly at first, and then rapidly as the gel-point of the polymer is approached. The reaction is terminated before gelation has occurred, normally at about 25–35% conversion of monomer to prepolymer. The polymerization may be terminated by any standard procedure such as lowering the temperature, adding a solvent for the monomer which precipitates the prepolymer, or adding a polymerization inhibitor. The product of this polymerization is a solution containing prepolymer dissolved in monomer. The prepolymer is separated from monomer and residual solvent by known procedures, such as by stripping off volatile components, or dissolving the monomer in an appropriate solvent.

Diallyl phthalate prepolymers are linear or slightly branched, solid polymers containing residual unsaturation. The number average molecular weight of the prepolymer is generally less than about 25,000 and usually below about 10,000. These prepolymers are normally characterized by their precipitated polymer viscosity which is measured as a 25% solution of prepolymer in diallyl phthalate monomer at 25° C. The precipitated polymer viscosity is generally in the range of about 100–1,000 centipoises, and preferably 200–700 centipoises.

To get the desired ability to form a film, it is necessary to blend the prepolymers with from 5 to 50 parts by weight for each 100 parts of prepolymers of a polyester resin of well-defined characteristics. Most important, the polyester must be capable of copolymerization with the diallyl phthalate prepolymer. To get this property, from 25 to 75 mol percent of the polybasic acid used in the resin must be unsaturated. The cheapest unsaturated polybasic acids are maleic and fumaric acids, and these are the acids of choice. Any saturated polybasic carboxylic acid may be used for the rest of the acid, phthalic anhydride being generally used because of its low cost. The polyester must be condensed to a point where it is solid at room temperatures, i.e., its melting point should be above about 35° C., and it should melt below 120° C. Any glycol can be used which will give the desired melting points. Among the preferred glycols are ethylene glycol, diethylene glycol and propylene glycol. The amount of polyester needed depends, to some extent, on its melting point, and the other ingredients in the finished composition, and on the presence or absence of diallyl phthalate monomer. In general, the highest ratios are needed where the polyester is in the upper melting point range, and there is no monomer present.

As indicated above, a polymerization catalyst, preferably in the form of an organic peroxide, is used to catalyze the final cure of the resin. From about ¼ to about 7 parts by weight of peroxide per hundred parts by weight of diallyl phthalates is used. Preferably the peroxide is present from about 2 to 3 parts. Useful peroxides include diacyl peroxides such as benzoyl peroxide, p-chlorobenzoyl peroxide, 2,4-dichlorobenzoyl peroxide, lauroyl peroxide, and succinic peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-diperphthalate, tert.-butyl peracetate, tert.-butyl peroxyisobutyrate and isopropyl percarbonate, as well as many other organic peroxides which have been described in the literature.

A polymerization inhibitor is sometimes used, in minor amounts, to prevent advance in polymerization during milling. A typical inhibitor includes hydroquinone, tertiary butyl catechol, p-benzoquinone, anthraquinone, propyl gallate and polydehydrated phenols. Moreover, we prefer to add the polymerization inhibitor to the mill at the very beginning of the milling operation, to minimize premature polymerization.

While unfilled compositions can be used in accordance with this invention, we prefer to add filler to reduce the cost of the composition. The fillers may be any of the conventional non-reinforcing fillers used in the art, for example, clays, calcium carbonates, various forms of silica, mineral fillers such as asbestine and wollastonite, and they may include reinforcing fibrous fillers such as milled glass fibers. Preferred compositions also contain some pigment, such as titanium dioxide, or some color pigment to produce a desired color. In general, the filler and pigment should occupy less volume in the composition than resin, and we generally operate with less than 200 parts by weight filler plus pigment to each 100 parts of prepolymer in the composition.

To facilitate complete mixing of the ingredients, generally carried out in a ball mill, small amounts of known dispersion aids, such as metallic soaps and silicone materials, can be very useful, and we often add them to our compositions.

Additionally, we have found it useful to incorporate small amounts of diallyl phthalate monomer, up to 10 parts per hundred of prepolymer, in the compositions of this invention. These small additions of monomer help the flow of the compositions during application, and are polymerizable into the final thermoset copolymer, so that the flow is aided without introducing a constituent which must be removed from the film. Low levels of monomer also aid substantially in maintaining a dense bed during fluidization and reduce dust losses.

In using the compositions, the powdered mixture is either suspended in a fluid bed into which the articles to be coated are dipped, hot, or the particles are sprayed against the hot article in an electrostatic spray apparatus. After coating, the articles are post cured to smooth out the film and cause copolymerization and thermosetting of the coating.

Typical examples of the invention are here given by way of example, and not by way of limitation.

EXAMPLE 1

*Preparation of prepolymer*

A typical diallyl phthalate prepolymer was prepared as follows: 8,860 lbs. of diallyl orthophthalate monomer, 622 lbs. of isopropanol (91% by vol.) and 75 lbs. of hydrogen peroxide (50.5% $H_2O_2$) were charged to a 1,500 gal. stainless steel reactor, thoroughly agitated and heated to a pot temperature of 104-108° C. at total reflux. After 10 hours the viscosity of the reaction mixture had increased to 27 cps. at 106° C., as measured by a Bendix Ultravision computator. The batch was cooled, to obtain a reaction product having a viscosity of 425 cps. at 25° C. This polymeric reaction product, which consists of 27% prepolymer, 67% unreacted monomer and 6% isopropanol, was mixed intimately with 48,000 lbs. of isopropanol (91% by vol.), and the prepolymer precipitated at 0° C. The solid polymer was separated by filtration and dried, to yield a 27.6% conversion of monomer to prepolymer. The properties of the prepolymer obtained by this process were:

| | |
|---|---|
| PPV, cps. at 25° C. | 354 |
| Softening range, ° C. | 80–105 |
| Iodine number | 55 |
| Sp. gr. at 25° C. (ASTM D 792–50) | 1.267 |

The PPV given above is the precipitated polymer viscosity of a 25% solution in monomer at 25° C.

EXAMPLE 2

*Polyester resin*

Equivalent weights of propylene glycol and a 50-50 molar mixture of maleic anhydride and phthalic anhydride were heated together at 200° C. until the acid number was reduced to about 5, and the product was a solid at room temperature, with a melting point of about 40° C.

EXAMPLE 3

*Unfilled composition*

The following ingredients were added in order to a three gallon ceramic ball mill: Prepolymer of Example 1—2,000 grams, polyester resin of Example 2—500 grams, titanium dioxide—250 grams, hydroquinone—0.11 gram. The mill was about one-quarter filled with Burundum grinding media, then allowed to grind for about 16 hours after which time the liquid ingredients—50 grams T-butyl perbenzoate and 62.5 diallyl phthalate monomer—were added. The grinding was continued for four additional hours.

The blended mixture was placed in an Armstrong Vibro Fluidizer which was filled to about half full. The air and vibrator were adjusted so that a fluid-like bed was formed. Various shapes of brass, copper, steel, iron and aluminum were coated.

The parts were preheated in an oven at 150° C., then dipped in the fluid bed from 4 to 20 seconds, after which the coated parts were post cured at 160° C., for 5 to 60 minutes to complete the cure. Continuous coatings up to 40 mils thickness were observed on the 20 second dips.

Electrical tests indicated that the parts had the desirable resistance to moisture typical of diallyl phthalate compositions.

EXAMPLE 4

In this experiment the following ingredients were charged to a ball mill containing Burundum grinding media:

| | Grams |
|---|---|
| Diallyl phthalate resin of Example 1 | 900 |
| t-Butyl perbenzoate | 22.5 |
| Polyester resin of Example 2 | 220 |
| Wollastonite | 335 |
| ¼″ glass fiber | 400 |
| Titanium dioxide | 120 |
| Tris (ethoxyethoxy) vinylsilane | 8 |

The above ingredients were milled for 24 hours. Then 40 grams of diallyl phthalate monomer was added and ball milling continued for four additional hours. This resin blend was added to the Armstrong machine as in Example 3. This system gave continuous coatings on parts preheated from 130 to 160° C. and postcured as in Example 3. Improved edge coating and adhesion were observed with this formulation.

The product of this example was also sprayed in an electrostatic sprayer with good results.

EXAMPLE 5

A polyester resin was prepared by heating a mixture consisting of 400 pts. by weight maleic anhydride, 331 pts. isophthalic acid and 414 pts. ethylene glycol (10% excess) under a nitrogen atmosphere until an acid value of 20 was achieved. On cooling the solid resin exhibited a melting point of about 40° C.

This was substituted for the polyester resin used in Examples 3 and 4, and good results were obtained.

Obviously, examples can be multiplied indefinitely without departing from the scope of the invention as defined in the claims.

We claim:

1. A powdered composition comprising a diallyl phthalate prepolymer whose number average molecular weight is less than about 25,000 and also containing for each 100 parts by weight of diallyl phthalate prepolymer 5 to 50 parts by weight of a solid polyester which has a melting point above about 35° C. but below 120° C., and which contains as its acid constituent from 25 to 75 mol percent of unsaturated polybasic acid, a small amount of diallyl phthalate monomer, not in excess of 10 parts by weight per hundred parts of prepolymer, and a peroxide polymerization catalyst in sufficient quantity to insure the copolymerization of the prepolymer and the polyester on heating.

2. The composition on claim 1 in which the unsaturated polybasic acid in the polymer is selected from the group comprising maleic and fumaric acids.

3. The composition of claim 1 in which there is present a filler.

(References on following page)

References Cited

UNITED STATES PATENTS

| | | | |
|---|---|---|---|
| 2,757,160 | 7/1956 | Anderson | 260—862 |
| 3,240,744 | 3/1966 | Kusiak | 260—873 |
| 3,249,656 | 5/1966 | Kalinouski | 260—885 |

FOREIGN PATENTS 232,412  10/1959  Australia.

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,331,891                                      July 18, 1967

James L. Thomas et al.

It is hereby certified that error appears in the above numbered patent requiring correction and that the said Letters Patent should read as corrected below.

Column 3, line 43, for "Ultravision" read -- Ultraviscoson -- line 63, for "wtights" read -- weights --; column 4, line 3, after "62.5" insert -- grams --; line 31, for "ethoxyethoxy" read -- ethoxyathoxy --; line 69, for "on" read -- of --.

Signed and sealed this 24th day of September 1968.

(SEAL)
Attest:

Edward M. Fletcher, Jr.                                EDWARD J. BRENNER

Attesting Officer                                                Commissioner of Patents